Jan. 18, 1927.
B. H. FERGUSON
1,614,833
LOCK FOR AIR BRAKE RELEASE RODS
Filed March 25, 1926
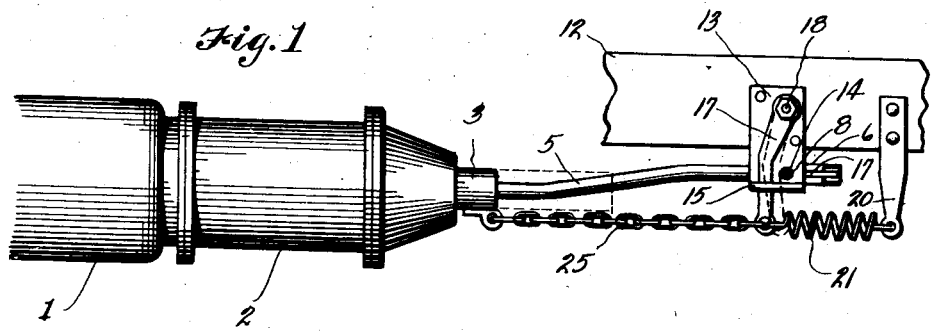
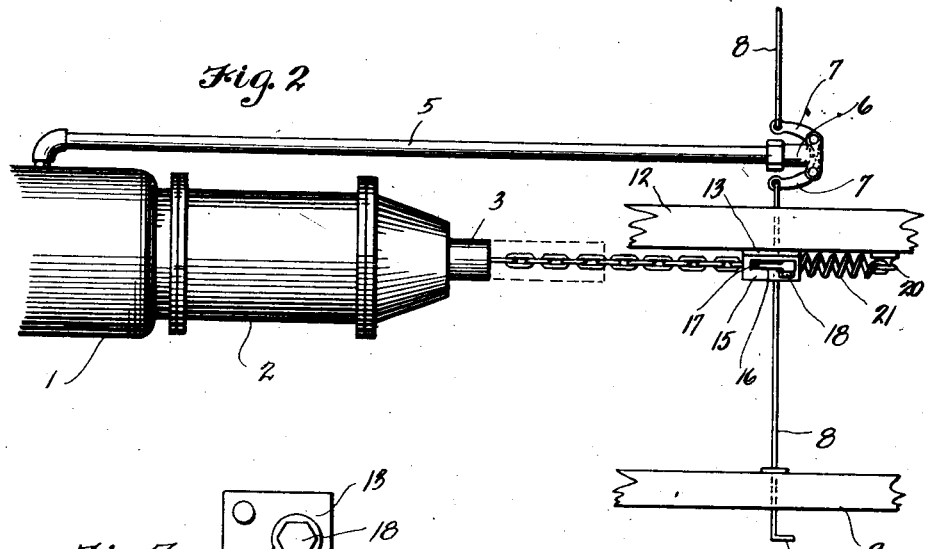
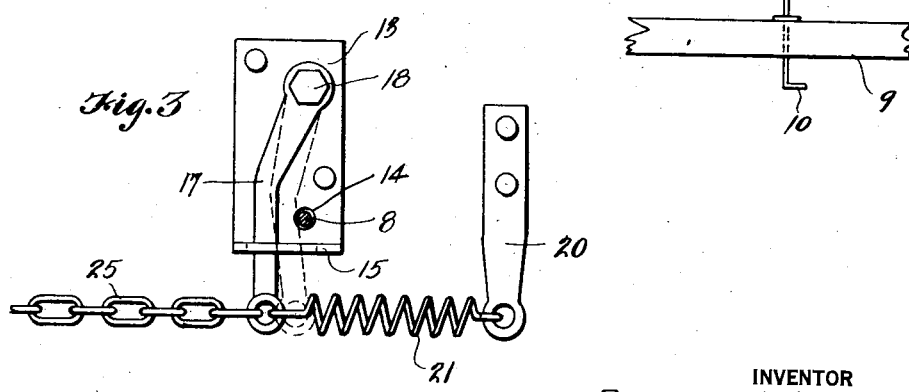
INVENTOR
BENJAMIN H. FERGUSON
BY
Richard J. Cook
ATTORNEY Patented Jan. 18, 1927.

1,614,833

UNITED STATES PATENT OFFICE.

BENJAMIN H. FERGUSON, OF AUBURN, WASHINGTON.

LOCK FOR AIR-BRAKE RELEASE RODS.

Application filed March 25, 1926. Serial No. 97,320.

This invention relates to improvements in air brake equipment and more particularly to improvements in air release rods and associated parts as used in connection with air brakes of that character now generally used on railway cars.

It is the principal object of this invention to provide means whereby an air release rod, when pulled out so as to open the air valve, will be held in this position until air from the brake cylinder has been exhausted and will then be released so that the valve will close.

Explanatory to the invention I will state that when a train of cars, equipped with Westinghouse air brakes, is drawn into a terminal, or station, and the engine is disconnected from the train, all the brakes, by virtue of the details of construction and mode of operation, automatically set and before the train can be broken up for switching it is required that the auxiliary reservoirs of each car be "bled" of its air in order to release its brake.

In each car the inflow of compressed air into the auxiliary reservoir from the train line is under the control of a release valve forming a part of the equipment and its outflow to atmosphere is under the control of a valve mechanism having actuating levers to which release rods are attached and extended to opposite sides of the car where trainmen may have access to them for the purpose of opening the valve to exhaust air from the brake cylinders and thus release the brakes.

With the release rod equipment now generally in use it is required that the same be held out by the trainmen until all the air has been exhausted and it is readily apparent that, this being the case, in a train of many cars this will require considerable time and incidentally is expensive.

In view of the above statement it has been the object of this invention to overcome these undesirable features by the provision of a lever that is spring tensioned and is mounted so as to holdingly engage with an air release rod to retain it in position to hold the air release valve open and which has an operative connection with the brake piston whereby, when the air has been exhausted and the brake released, the lever will be disengaged from the rod so that it may move back and allow the valve to close.

Other objects reside in the various details of construction and combination of parts embodied in the invention and in their mode of operation.

In accomplishing these and other objects, I have provided the improved details of construction, the preferred forms of which are illustrated in the accompanying drawings, wherein—

Figure 1 is a side elevation of parts of an air brake mechanism, showing an air release rod holding means embodied by this invention.

Figure 2 is a plan view of the same parts.

Figure 3 is an enlarged side view of the spring tensioned locking lever.

Referring more in detail to the drawings—

1 designates a portion of the auxiliary reservoir of an air brake mechanism and 2 the brake cylinder into which air is admitted by the manipulation of parts not shown from the auxiliary reservoir to apply the brake; this being effected by the outward movement from the brake cylinder of the piston rod 3. When air is released from the auxiliary reservoir, and incidentally from the brake cylinder by the action of a triple valve mechanism, a spring contained within the brake cylinder and bearing against the piston draws the piston and rod 3 inwardly to release the brake; these latter parts not herein being illustrated as the construction is well known in the art.

Connected with the auxiliary reservoir is an air exhaust pipe 5 that extends parallel with the brake cylinder to a position in advance of the piston rod and is there provided with a release valve mechanism 6 operable, by means of pivotally mounted outwardly yieldable levers 7, to open position to exhaust air from the cylinder so that the brake mechanism will be released.

Attached to the levers 7 and extending to opposite sides of the car are pull rods 8 which, at their outer ends, are slidable through supporting members 9 and have laterally turned ends 10 forming handle portions whereby they may be drawn outwardly to open the valve.

Mounted on a supporting beam 12 of the car floor, or other suitable parts, is a depending bracket 13 having an opening 14 therein through which a rod 8 is slidably extended and at its lower end the bracket has a laterally turned flange 15 provided with a slot 16 through which the lower end portion of a lever 17 extends; the upper end of the lever being pivotally fixed to the bracket by means of a bolt 18. Also fixed to beam 12 is a downwardly extending bar 20 and a coiled, tensioning spring 21 is attached at its ends to the lower end of this bar and to the lower end of the lever 17 for the purpose of drawing the lever tightly against the valve release rod 8 so that the latter will be held at an outwardly adjusted position.

A flexible connection, such as a chain 25, is also provided between the lower end of the lever 17 and end of the piston rod and this is of such length that when the brakes are applied it will be slack but when the piston rod has been retracted into the brake cylinder incidental to the release of air therefrom, it will be drawn taut and will overcome the holding tension of spring 21 and will disengage the lever 17 from the rod 8 and thus permit the rod to move inwardly so that the release valve will close.

With each car so equipped it is apparent that when a train has been brought into a station and the engine disconnected and the brakes all set, and it is desired to break up the train for switching, a trainman may when making the inspection round, pull outwardly on the air valve release rods 8 to open the valves. It is apparent that, when the brakes are set, the chains 25 are slack enough to allow the springs 21 to draw the levers 17 tightly against the rods 8 and to hold them out after they have been drawn out. It is also apparent that, as the air is exhausted from the cylinders the piston rods move inwardly to release the brakes and as they move to their inner limit they cause chains 25 to be drawn taut to disengage levers 17 from the rods 8 and thus allow the air release valves to close. By provision of the chains 25, it is not necessary that a trainman make an extra trip to close the valves after the brakes have been released.

Having thus described my invention, what I claim as new therein and desire to secure by Letters-Patent, is:

1. In a brake system of the character described, the combination with an auxiliary reservoir and a brake cylinder, an air release valve for the reservoir and cylinder, a brake actuating piston operable into and from the cylinder and a pull rod for releasing the valve, of a pivotally mounted lever, yieldable means attached to the lever for drawing it into holding contact with the pull rod and a connection between the lever and the piston whereby the lever will be disengaged from the pull rod when the piston has moved to brake releasing position.

2. In a braking system of the character described the combination with an auxiliary reservoir and a brake cylinder, an air release valve for the reservoir and cylinder, a brake actuating piston operable into and from the cylinder and a pull rod for releasing the valve, of a guide bracket having an aperture therethrough through which the pull rod slidably extends, a lever pivotally attached to the bracket, a coiled spring attached to the lever and adapted to draw the latter into holding contact with the pull rod and a flexible connection between the lever and piston whereby the lever will be disengaged from the pull rod when the piston is in brake releasing position.

3. In a braking system of the character described, the combination with an auxiliary reservoir and a brake cylinder, an air release valve for the reservoir and cylinder, a brake actuating piston operable into and from the cylinder and a pull rod for releasing the valve of a guide bracket having an aperture therein through which the pull rod extends and having a laterally turned flange provided with a slot, a lever pivotally fixed to the bracket with its swinging end portion extended through the slot of the flange, a coiled spring attached to the swinging end of the lever whereby the lever will be drawn into holding contact with the pull rod and a flexible member connecting the lever with the piston whereby the lever will be released from the pull rod when the piston has moved to brake releasing condition.

Signed at Seattle, Washington, this 15th day of March, 1926.

BENJAMIN H. FERGUSON.